United States Patent
Ramoutar et al.

(10) Patent No.: US 11,509,758 B2
(45) Date of Patent: Nov. 22, 2022

(54) APPARATUS AND METHOD FOR PRESENTING VISUAL CONTENT FROM A SMART DEVICE

(71) Applicant: Phone Docker Ltd., North York (CA)

(72) Inventors: Oscar Ramoutar, Brampton (CA); Ali Amiri Shad, North York (CA)

(73) Assignee: PHONE DOCKER LTD., North York (CA)

( * ) Notice: Subject to any disclaimer, the term of this patent is extended or adjusted under 35 U.S.C. 154(b) by 0 days.

(21) Appl. No.: 16/994,806

(22) Filed: Aug. 17, 2020

(65) Prior Publication Data
US 2022/0053084 A1    Feb. 17, 2022

(51) Int. Cl.
*H04M 1/72409* (2021.01)
*H04M 1/04* (2006.01)
*G06F 1/16* (2006.01)
*G06F 3/02* (2006.01)

(52) U.S. Cl.
CPC ...... *H04M 1/72409* (2021.01); *G06F 1/1632* (2013.01); *G06F 1/1654* (2013.01); *G06F 3/0202* (2013.01); *H04M 1/04* (2013.01)

(58) Field of Classification Search
CPC ... H04M 1/72409; H04M 1/04; G06F 1/1632; G06F 1/1654; G06F 3/0202
See application file for complete search history.

(56) References Cited

U.S. PATENT DOCUMENTS

| | | | | |
|---|---|---|---|---|
| 2010/0250816 A1* | 9/2010 | Collopy | ................ | G06F 1/1632 345/173 |
| 2011/0230178 A1* | 9/2011 | Jones | .................. | H04M 1/0241 455/566 |
| 2012/0162908 A1* | 6/2012 | Lo | .......................... | G06F 1/1632 361/679.55 |
| 2013/0109371 A1* | 5/2013 | Brogan | ................. | G06F 1/1649 361/679.09 |
| 2013/0162515 A1* | 6/2013 | Prociw | ..................... | G06F 3/14 361/679.09 |
| 2013/0219519 A1* | 8/2013 | Russello | ............. | G06F 13/4081 726/29 |

(Continued)

FOREIGN PATENT DOCUMENTS

WO    WO 2017/053169 A1    3/2017

OTHER PUBLICATIONS

Jacob Kastrenakes. The Verge. "Samsung proposes an Android phone that transforms into a Windows laptop" [online], Webpage <https://www.theverge.com/2015/5/26/8659935/samsung-android-smartphone-windows-laptop-dock-patent>, retrieved from Internet Archive Wayback Machine <https://web.archive.org/web/20200202015631/https://www.theverge.com/2015/5/26/8659935/samsung-android-smartphone-windows-laptop-dock-patent> for Feb. 2, 2020, published on May 26, 2015, 2 pages.

(Continued)

*Primary Examiner* — Md K Talukder
(74) *Attorney, Agent, or Firm* — Holbeche Law; Kevin Edward Holbeche

(57) ABSTRACT

Embodiments described herein provide a device for presenting for presenting visual content from a smart device, having a housing including a base pivotably connected to a display panel; and a receiver configured to receive a signal from the smart device and transmit the signal from the smart device to the display panel; where the housing is not configured to transmit a control signal to the smart device.

12 Claims, 3 Drawing Sheets

(56) References Cited

U.S. PATENT DOCUMENTS

| | | | | |
|---|---|---|---|---|
| 2015/0111612 A1* | 4/2015 | Yaghmour | ............ | G06F 1/1632 455/557 |
| 2015/0138094 A1* | 5/2015 | Kim | ...................... | G06F 1/1654 345/173 |
| 2017/0083048 A1* | 3/2017 | Degner | ................ | G06F 1/1632 |

OTHER PUBLICATIONS

NexDock, "NexDock turns your Smartphone into a touch screen Laptop" [online], Webpage: <https://nexdock.com/> (accessed on Nov. 11, 2020), retrieved from Internet Archive Wayback Machine <https://web.archive.org/web/20200814000438/https://nexdock.com/> for Aug. 14, 2020, 9 pages.

Miraxess, "The MiraBook turns your smartphones into a Laptop" [online], Webpage: <https://miraxess.com> (accessed on Nov. 11, 2020), retrieved from Internet Archive Wayback Machine <https://web.archive.org/web/20200620223417/https://miraxess.com/> for Jun. 20, 2020, 4 pages.

Razer, "Razer Project Linda" [online], Webpage: <https://www.razer.com/ca-en/concepts/project-linda> (accessed on Nov. 11, 2020), retrieved from Internet Archive Wayback Machine <https://web.archive.org/web/20200718205229/https://www.razer.com/ca-en/concepts/project-linda> for Jul. 18, 2020, 10 pages.

Samsung, "Open a new desktop world with Samsung DeX" [online], Webpage: <https://www.samsung.com/us/explore/dex/> (accessed on Nov. 11, 2020), retrieved from Internet Archive Wayback Machine <https://web.archive.org/web/20200814105737/https://www.samsung.com/us/explore/dex/> for Aug. 14, 2020, 9 pages.

Anyware, "PhoneBook" [online], Webpage: <https://www.kickstarter.com/projects/1031149173/phonebook-turn-any-smartphone-into-a-laptop-computer/posts/2936322> (accessed on Nov. 13, 2020), retrieved from Internet Archive Wayback Machine <https://web.archive.org/web/20200110013014/https://www.kickstarter.com/projects/1031149173/phonebook-turn-any-smartphone-into-a-laptop-computer/posts>, for Jan. 10, 2020, 17 pages.

Sentio, "Your Phone Doubles as Your Laptop" [online], Webpage: <https://sentio.com> (accessed on Nov. 11, 2020), retrieved from Internet Archive Wayback Machine <https://web.archive.org/web/20200808233626/https://sentio.com/> for Aug. 8, 2020, 11 pages.

Kate Kozuch. Tom's Guide, Future US, Inc. "Apple patent reveals MacBook-like dock for iPhones and iPads" [online], Webpage: <https://www.tomsguide.com/news/apple-patents-device-that-docks-iphones-ipads-inside-macbooks#:~:text=Apple%20has%20patented%20a%20host,of%20a%20portable%20computing%20device.%22> (accessed on Nov. 13, 2020), Jan. 28, 2020, 10 pages.

* cited by examiner

APPARATUS AND METHOD FOR PRESENTING VISUAL CONTENT FROM A SMART DEVICE

FIELD

The present disclosure generally relates to the field of docking stations for devices, and, in particular, to apparatuses and methods for presenting visual content from a smart device.

INTRODUCTION

Smartphone users often interact with their smartphones using the smartphone's screen. Users may have many tasks to complete using their smartphone and their productivity may be limited by the limitations of the smartphone used. Accessories can be expensive and may pose compatibility issues with various smartphones.

SUMMARY

In accordance with an aspect, there is provided a device for presenting visual content from a smart device. The device has a housing that includes a base pivotably connected to a display panel; and a receiver configured to receive a signal from the smart device and transmit the signal from the smart device to the display panel. The housing is not configured to transmit a control signal to the smart device.

In some embodiments, the receiver is operably connected directly to the base.

In some embodiments, the receiver is positioned within a recess dimensioned to receive the smart device.

In some embodiments, the receiver is operably connected directly to the display panel.

In some embodiments, the receiver is operably connected directly to the display panel at a surface opposite to a visual component of the display panel.

In some embodiments, the receiver includes a USB cable.

In some embodiments, the receiver includes a lightning cable.

In some embodiments, the receiver includes an interface operable to receive a wireless connection.

In some embodiments, the receiver is configured to transmit electrical power.

In some embodiments, the base is connected to a keyboard input component operably connected to the smart device.

In some embodiments, the keyboard input component is operably connected to the smart device by Bluetooth.

In some embodiments, the display panel is configurable to display the visual content based on the signal.

In some embodiments, the smart device is connected to the housing via the receiver.

In accordance with an aspect, there is provided a method for presenting a visual from a smart device including receiving, at a housing, a signal from the smart device for configuring a display included in the housing; and configuring the display based on the signal. The housing is not configured to transmit a signal to the smart device.

In some embodiments, the method further includes receiving directly from a keyboard input component, at a processor in the smart device, a data indicator representing keyboard input.

Other aspects and features and combinations thereof concerning embodiments described herein will be become apparent to those ordinarily skilled in the art upon review of the instant disclosure of embodiments in conjunction with the accompanying figures.

BRIEF DESCRIPTION OF THE DRAWINGS

In the figures, embodiments are illustrated by way of example. It is to be expressly understood that the description and figures are only for the purpose of illustration and as an aid to understanding. Embodiments will now be described, by way of example only, with reference to the attached figures, wherein in the figures.

DETAILED DESCRIPTION

Utilizing a smartphone to work in place of a laptop may be desirous in several situations. Notably, many owners may want to reduce the number of devices they carry. Smartphones may contain enough computing power to carry out several tasks including word processing and playing videos but typically have small screens. Due to the small size of smartphones, both laptops and smartphones may be typically needed to accomplish tasks.

Embodiments described herein provide a device for presenting a visual from a smart device, such as a smartphone. In some embodiments, the device includes a display panel such as a screen that is larger than screens typically included in smart devices so that users are provided with an enhanced display panel. In some embodiments, the device does not include an operating system or software applications or capability to receive input from keyboards or cameras to direct as input to the smart device. For example, in some embodiments, the device is attached to or houses a Bluetooth keyboard that communicates directly with the smart device to provide keystroke data to the smart device without requiring processing or computing capability in the device itself. In some embodiments, the device is operable to receive output signals from the smart device (e.g., HDMI, USB-C, lightning, Bluetooth, Wifi) and configure or present visual content on the display panel without requiring a controller in the device for sending signals or data to the smart device. The output signals can be transmitted wirelessly or via a wired connection in various embodiments. This can help provide a simple and improved design such that the device does not have an operating system or require software updates that could interfere with the functionality of the smartphone or display or pose compatibility issues. This can allow for an increased variety of smart devices that can connect and interoperate with the device to present a visual to the user, as well as allowing for the device to not require replacement when new smart devices (e.g., having different operating systems or software applications) are introduced to the market.

Figure 1:
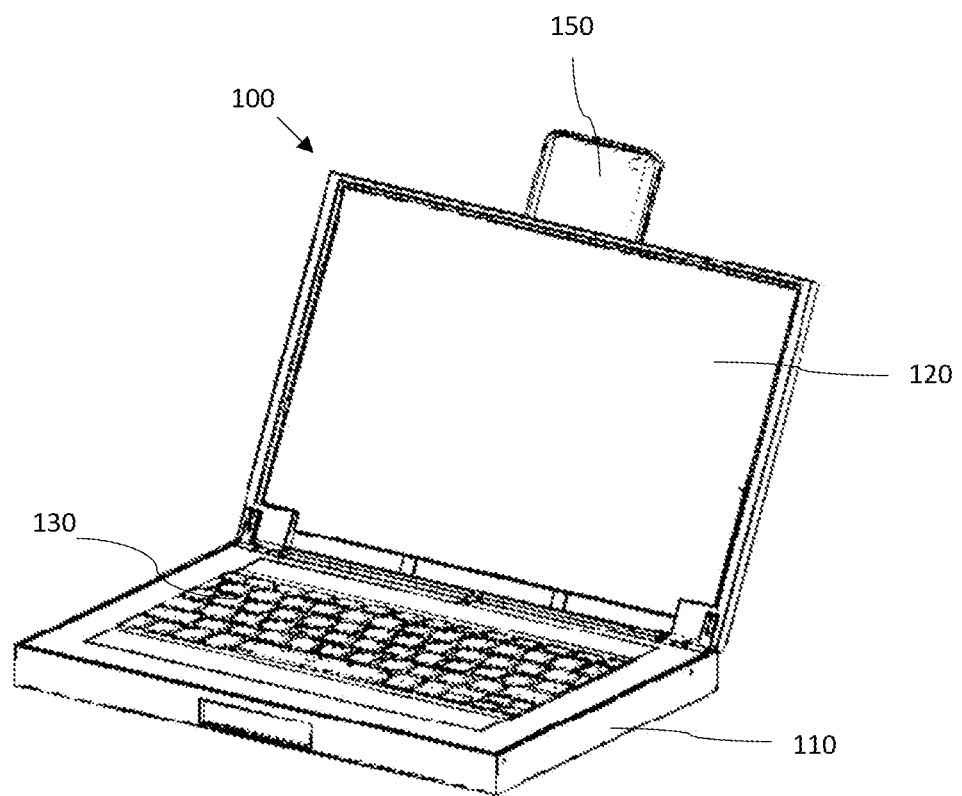
FIG. 1 is a front perspective view of a device for presenting a visual from a smart device, according to some embodiments.
Figure 2:
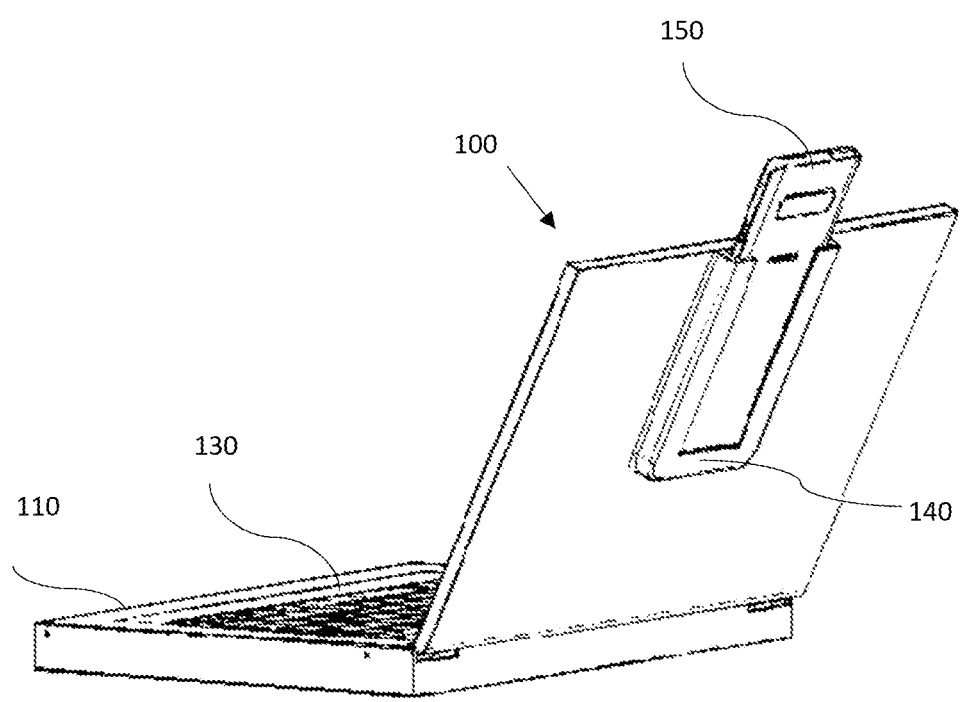
FIG. 2 is a rear perspective view of the device illustrated in FIG. 1, according to some embodiments.

FIG. 1 and FIG. 2 are perspective views of an example device for presenting a visual from a smart device 150, according to some embodiments. The example device includes a housing 100 having a base 110 pivotably connected to a display panel 120. The connection can allow the base 110 to form an angle with the display panel 120 such that a user can easily or comfortably position oneself and interact with the device in a way similar to a laptop. The display panel 120 can be a visual display, a monitor, or a screen, for example. The housing 100 includes a receiver 140 configured to receive a signal from the smart device 150 and be operable to transmit a signal from the smart device 150 and to the display panel 120. In some embodiments, this signal is transmitted to enable display panel 120 to present a visual without the housing 100 requiring an operating system or software applications. In some embodiments, the housing 100 is not operable to transmit a signal to the smart device 150. In some embodiments, the housing 100, for example, at receiver 140, is not operable to transmit a signal to the smart device 150 except to establish a connection such as a communication channel. The communication channel can be only operable to enable display of a visual on the display panel 120, for example. In some embodiments, the housing 100 is operable to receive a signal from the smart device 150 and use same to configure or display a visual on the display panel 120. In some embodiments, the housing is not configured to transmit or provide a control signal to the smart device 150 such as to provide configuration input (such as keyboard, camera, or accessory input) to the smart device 150. In some embodiments, the housing is not configured to process data from the smart device 150 by executing a software program. In some embodiments, an input (such as from a keyboard or camera or accessory device) is communicated to the smart device 150 directly (e.g., not via the housing 100; not involving processing by the housing 100; not involving manipulation of the data; and/or not involving execution of a software program using or in relation to the data). In some embodiments, housing 100 is operable to decode a signal received from the smart device 150 at receiver 140 to enable display of a visual on the display panel 120 and is not operable to transmit input from an accessory device (e.g., keyboard, camera, microphone, etc.) to the smart device 150. In some embodiments, housing 100 is operable to display a visual on display panel 120 using input, data, or a signal from a smart device 150 and is not operable to provide input from a keyboard to the smart device 150. In some embodiments, housing 100 is operable to display a visual on display panel 120 using input, data, or a signal from a smart device 150 and is not configured with an operating system and/or is not configured with software applications. These designs can greatly improve the versatility of the housing 100 for use with a wide variety of smart devices running different operating systems and software and/or can provide a greater simplicity for docking stations or display devices for use with smart devices such as in a laptop-like configuration, in some embodiments.

The signal received from the smart device 150 can be processed by decoding the signal at a graphics processing unit. The receiver 140 can be operable to receive the signal from the smart device 150 via a USB-C connection, lightning cable, Wifi, Bluetooth, 5G technology, or other physical or wireless connection, for example. The receiver 140 can transmit electrical power to the smart device 150 in some embodiments. In some embodiments, the receiver 140 is a communication channel established between the display panel 120 and the smart device 150. The communication channel is operable to receive signals from the smart device 150, where the signals can be used (e.g., decoded) to present content such as a visual at the display panel 120. In some embodiments, the receiver 140 is positioned and/or attached to the display panel 120, for example, at a surface opposite a surface where a visual (e.g., visual content received from the smart device 150) is presented to the user. In some embodiments, the visual content can be a video, image, animation, graphics, hologram, other visually detectable indicator, and/or combination of same, for example.

The housing 100 is not operable to transmit signals to the smart device 150 for controlling (e.g., requesting data from, sending keystroke data to) the smart device 150. For example, an input device such as a keyboard, camera, or microphone can be attached to the housing 100 or placed in proximity to the smart device 150 and communicate directly with the smart device 150, for example, over a physical or wireless connection, such as a connection compatible with USB-C, lightning, Wifi, Bluetooth, and/or 5G technology. As another example, the housing 100 simply receives a signal or signals from the smart device 150 that can be used and/or decoded to present visual content on the display panel 120 of the housing 150. This can be enabled without the use of an additional process or controller apart from a processor in the smart device. For example, in some embodiments, housing 100 is not operable to transmit a signal to the smart device 150. For example, in some embodiments, housing 100 is not operable to transmit data to the smart device 150 requesting visual content to be provided to the monitor 120 and is not operable to process data (using software applications) received from the smart device 150 to customize, at the housing 100, visual content for display on the monitor 120. In some embodiments, housing 100 simply receives signals from the smart device 150 for decoding to present visual content on the monitor 120.

In some embodiments, a monitor controller board is used to send a video signal to the display panel 120 from a smart device 150. The monitor controller board can be powered by a power bank, for example, and can include an HDMI-compatible connection or other connection (e.g., USB-C, lightning, Wifi, Bluetooth, 5G interface) that is configured to receive a smart device 150 signal.

In some embodiments, the user can use the smart device 150 and cause the display panel 120 to depict visual content corresponding to the actions on the smart device 150. For example, the smart device 150 screen may be duplicated or replaced by the display panel 120. The processing associated with selection of visual content for presentation on the display panel 120 can occur at a processor within the smart device 150, rather than housing this processing capability within the housing 100.

In some embodiments, the housing 100 is not configured for processing input (e.g., from a keyboard and/or camera) to a smart device 150 connected at the receiver 140. For example, in some embodiments, a keyboard input component 130 is connected to the housing 100 at the base 110 by a connection. The connection can be a physical connection such as within a recess in the base 110. As another example, the connection can be a receiver that is operable to receive a signal via a physical or wireless connection, such as a connection compatible with HDMI, Bluetooth, Wifi, or 5G technology. The keyboard input component 130 is then operably connected to the smart device 150, such as via Bluetooth or USB, and can receive keystrokes from a user and transmit keystroke data input and/or signals to the smart device 150 via the connection, without intermediation (e.g., processing) at the housing 100.

In some embodiments, there is provided an apparatus for retrofitting a smartphone to a docking station. For example, display panel 120 can be a monitor that connects to a smartphone through a connection such as a monitor controller board. A video signal is sent from the smartphone through the monitor controller board to the display panel

120. The apparatus is a docking station shell that uses the smartphone's operating system and does not contain additional software to operate.

A wide variety of types of smart devices can be connected to the housing 100 via a wide variety of types of connections, including physical or wireless connections. A smart device can be a smartphone or a portable processing device, for example, and different smart devices can run on different operating systems and be used with the same housing 100.

Figure 3:
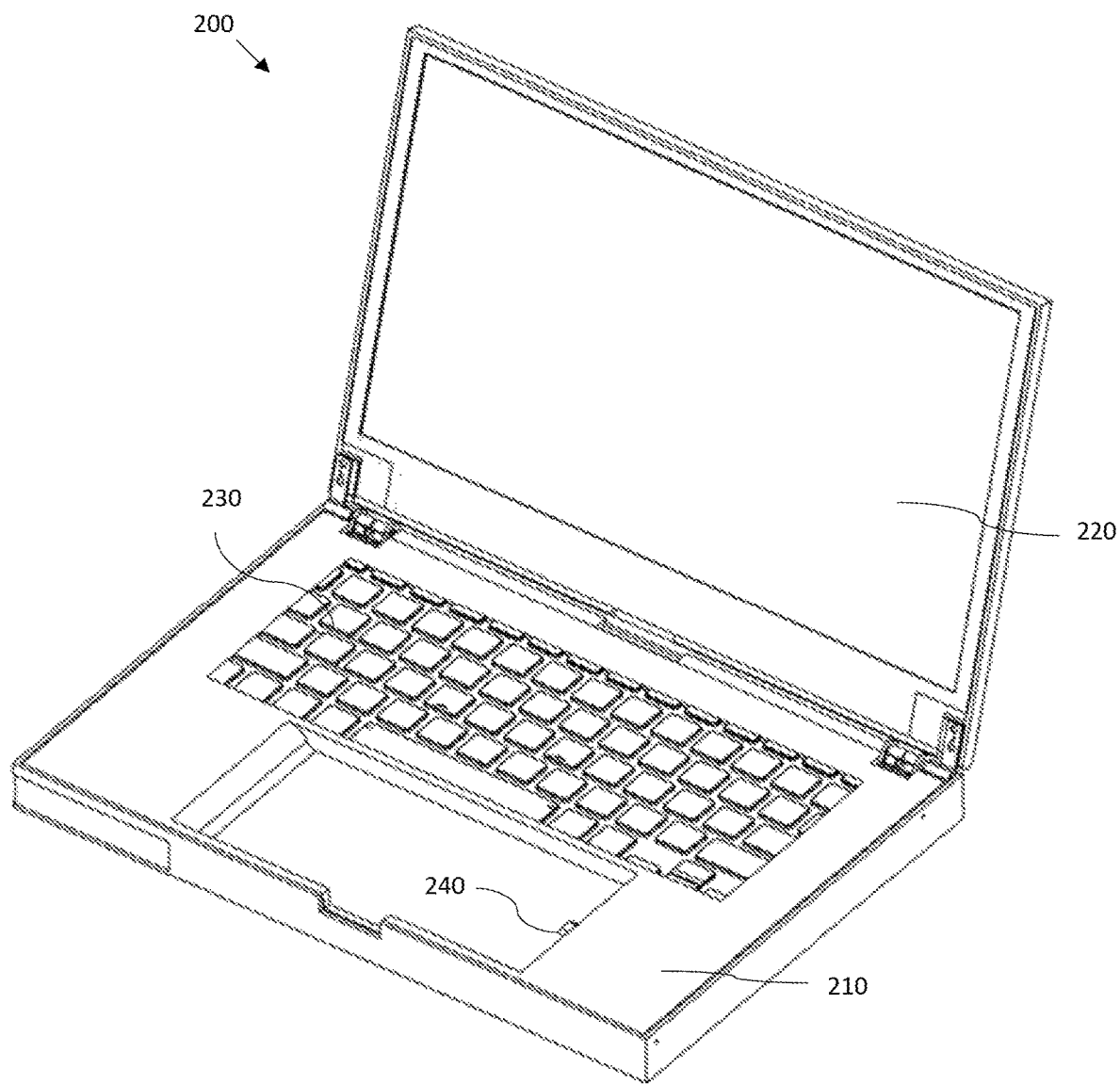
FIG. 3 is a front perspective view of a device for presenting a visual from a smart device, according to some embodiments.

FIG. 3 is a perspective view of an example device for presenting a visual from a smart device, according to some embodiments. As shown, the receiver 240 is positioned at and/or attached to the base 210 of the housing 200. The receiver 240 can be positioned within a recess in the base 210, the recess sized and dimensioned to receive a smart device. The configuration can improve the ease with which a user positioned at the device can configure the smart device, for example, to select or indicate one or more visuals to be presented on the display panel 120. In other respects, the components can operate similarly to that described in reference to the embodiments illustrated in FIG. 1 and FIG. 2, where components 200, 210, 220, 230, and 240 correspond to components 100, 110, 120, 130, and 240. For example, receiver 240 is configured to receive a signal from the smart device. The signal is transmitted to enable display panel 220 to present a visual without the housing 100 requiring an operating system or software applications. In some embodiments, the housing 100 is not operable to transmit a signal to the smart device.

In some embodiments, there is provided a docking station that enables a device (e.g., smart phone) to present features (e.g., visual content such as images, videos, or animations; indications on a display panel) on a display panel. The display panel can be a large display, for example, larger than a display included in a connected device such as a smart phone. The docking station does not have an operating system or software. In some embodiments, the docking station does not transmit signals to the device.

In some embodiments, there is provided a docking station that enables a device (e.g., smart phone) to present features (e.g., visual content such as images, videos, or animations; indications on a display panel) on a display panel. The display panel can be a large display, for example, larger than a display included in a connected device such as a smart phone. The docking station does not transmit control signals to the device. The docking station does not transmit input from an accessory device such as a keyboard, mouse, or camera to the device.

In some embodiments, there is provided an apparatus for retrofitting a smart device to a docking station. The apparatus has a docking station that has a monitor, Bluetooth keyboard, and wired or wireless connections for the smart device. The wired or wireless connection can be located near the keyboard, within a recess in a base of the docking station, and/or near or at the display panel or in a receiving component attached to the docking station.

In some embodiments, there is provided an apparatus having a display panel and a controller board to connect a smartphone to the display panel. The controller board is powered by a power bank or battery and sends video signal from a connected smartphone to the display panel.

In some embodiments, the device or apparatus described herein can help reduce the number of devices and operating systems a user uses, for example, by facilitating an environment where the user can rely on only one main device for all day to day jobs. This can improve computer security by reducing the number of points of attack and can provide an improvement to cybersecurity protocols. For example, an infected operating system, hard drive, and/or installed applications can compromise a user's data. Further, this can save on costs associated with upgrading additional devices such as laptops and allow the same housing or display panel to be used with a wide variety of types of smart devices, including having different operating systems. In some embodiments, the device or apparatus described herein can provide a simplified design for presenting visual content on a monitor from a smart device without requiring the device or apparatus to be configured with an operating system or a processor configured to enable transmission of data or signals to the smart device.

The discussion herein provides example embodiments of the technology. The technology is considered to include all possible combinations of the disclosed elements. Accordingly, if one embodiment comprises elements A, B, and C and a second embodiment comprises elements B and D, then embodiments of the technology are contemplated to also comprise elements A, B, C, and D, as well as other remaining combinations of A, B, C, or D, even if not explicitly disclosed.

Although embodiments have been described in detail, it should be understood that various changes, substitutions, and alterations can be made herein. Moreover, the scope of the present application is not intended to be limited to the particular embodiments of the process, machine, manufacture, composition of matter, means, methods and steps described in the specification.

As can be understood, the examples described herein and illustrated are intended to be exemplary only.

What is claimed is:

1. A docking device for presenting visual content from a smart device, the docking device adapted for selective use with a separate keyboard input component operably connected to the smart device by Bluetooth for direct transmission of a control signal from the separate keyboard input component to the smart device, wherein the docking device comprises:
    a housing having: an integral display panel; a base pivotably connected to the integral display panel, with the base adapted for selective physical connection to the separate keyboard input component; and a receiver configured to receive a display signal from the smart device and transmit the display signal from the smart device to the integral display panel;
    wherein said direct transmission of the control signal from the separate keyboard input component to the smart device is independent of the housing and of the docking device.

2. The docking device of claim 1, the receiver operably connected directly to the base.

3. The docking device of claim 2, the receiver positioned within a recess dimensioned to receive the smart device.

4. The docking device of claim 1, the receiver operably connected directly to the integral display panel.

5. The docking device of claim 4, the receiver operably connected directly to the integral display panel at a surface opposite to a visual component of the integral display panel.

6. The docking device of claim 1, the receiver comprising a USB cable.

7. The docking device of claim 1, the receiver comprising a lightning cable.

8. The docking device of claim 1 the receiver comprising an interface operable to receive a wireless connection.

9. The docking device of claim 1, the receiver configured to transmit electrical power.

10. The docking device of claim 1, the integral display panel configurable to display the visual content based on the display signal.

11. An apparatus comprising the docking device of claim 1, the smart device connected to the housing via the receiver.

12. A method for presenting a visual from a smart device on a docking device, comprising steps of:
- receiving, at a housing of the docking device, a display signal from the smart device for configuring an integral display included in the housing;
- configuring the integral display based on the display signal; and
- receiving, at a processor in the smart device, a control signal from a separate keyboard input component, with the control signal representing keyboard input;
- wherein the smart device directly receives the control signal, from the separate keyboard input component, independent of the housing and of the docking device; and wherein the housing and the docking device are not configured to transmit the control signal to the smart device.

\* \* \* \* \*